June 4, 1974  J. E. MORGAN  3,814,819
HIGH PROTEIN FOOD BAR
Filed March 10. 1971
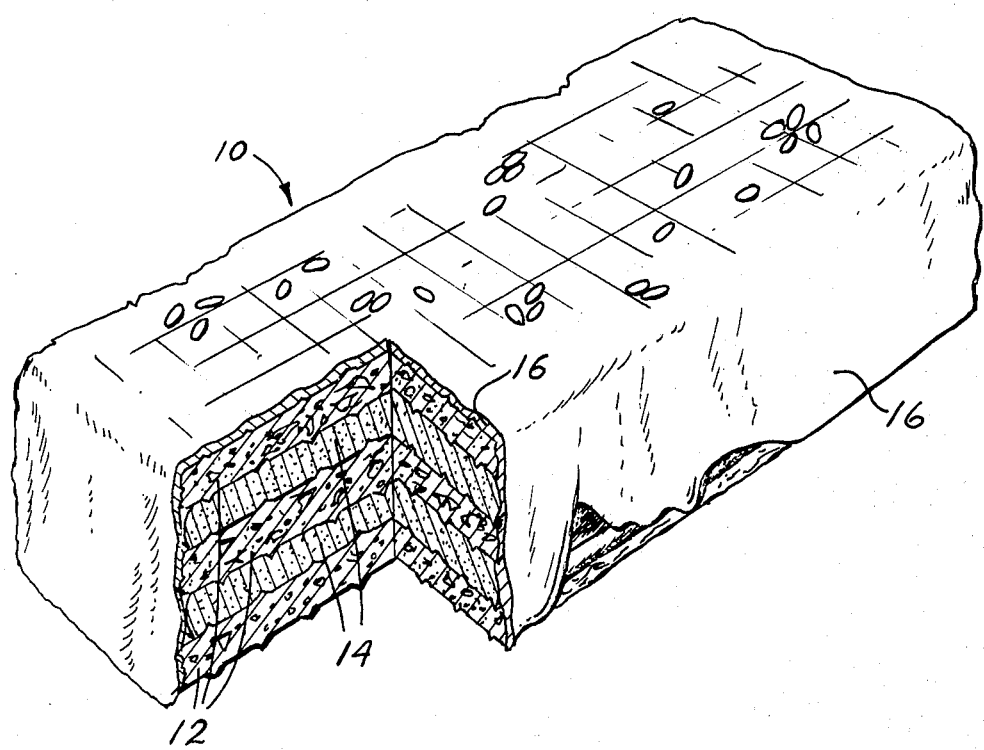
INVENTOR.
JAY E. MORGAN
BY
ATTORNEY

United States Patent Office 3,814,819
Patented June 4, 1974

---

3,814,819
HIGH PROTEIN FOOD BAR
Jay E. Morgan, Edina, Minn., assignor to The
Pillsbury Company, Minneapolis, Minn.
Filed Mar. 10, 1971, Ser. No. 122,912
Int. Cl. A23l 1/30
U.S. Cl. 426—72                          14 Claims

ABSTRACT OF THE DISCLOSURE

A protein fortified food bar of a controlled calorie content is composed of several crisp wafers stacked one above the other with a creamy filling between them. Each wafer is composed of 10 parts of flour, about 6 parts of added protein, e.g. calcium caseinate or a lactalbumin-casein co-precipitate, about 0.8 parts oil as a release agent and a small amount of chemical leavening. The filling layered between the wafers consists of 10 parts shortening, about 10 parts of a finely divided protein such as milk protein, about 6 parts sugar, a minor amount of flavor if desired and a vitamin and mineral mixture, if desired. A confectioners coating can be applied over the composite bar if desired.

FIELD OF THE INVENTION

The present invention relates to protein fortified foods and more particularly to a protein fortified food bar.

BACKGROUND OF THE INVENTION

There has in recent years been an ever increasing recognition of the fact that a significant percentage of the population suffers from nutritional deficiencies. This subject has been the concern of recent reports by the Surgeon General of the United States and the National Academy of Sciences.

The general objective of the invention is to provide a nutritionally balanced protein fortified bar of limited calorie content which will help to alleviate some of these nutritional problems while at the same time aiding obese persons and others who wish to regulate their caloric intake.

While lactalbumin and edible casein have been previously proposed in food products such as biscuits as a source of added protein, they are both deficient from a flavor standpoint.

The present invention is based in part upon the use of a protein and shortening composition. Sodium caseinate cannot be used successfully in such a composition at relatively high levels, e.g. 30–35% and above because too much shortening (usually more than 40%) is needed to make a satisfactory filling. This quantity of shortening is objectionable because it raises the caloric content of the filling excessively. Moreover, sodium caseinate cannot normally be used in a wafer in amounts more than about 20% because its high water absorption characteristics make it difficult to remove water when the product is baked.

After consultation with experts in the field of nutrition, it was decided to let each serving (e.g. two bars) provide ¼ of the Recommended Daily Allowance [1] of high quality protein, vitamins and minerals while at the same time limiting the caloric content to about 200 to 250 calories per meal. Food bars previously proposed were unable to fulfill the protein requirement as well as the limited caloric content established. Moreover, to be successful, the product must have textural and taste stability during storage, present an overall sense of freshness and must not create a dry sensation in the mouth when eaten.

[1] A publication of the Food Nutrition Board of the National Research Council.

OBJECT OF THE INVENTION

The primary objective of the invention is to provide an improved protein fortified food bar with the following characteristics and advantages: (a) caloric content limited to about 250 calories per meal, (b) provision of ¼ of the recommended daily allowance of high quality protein, vitamins and minerals, (c) flavor and textural stability when stored at room temperature, (d) a pleasing taste and aroma, (e) the provision of a fresh flavor and texture which does not create a dry sensation in the mouth when eaten, (f) the provision of an effective means for preventing the sensation of dryness normally perceived when a powered protein is eaten.

DESCRIPTION OF THE DRAWING

The figure is a perspective view of a bar of the invention shown partly in section.

SUMMARY OF THE INVENTION

As seen in the figure, protein fortified food bars 10 in accordance with the present invention are composed of several wafers 12 stacked one above the other each composed of cereal flour or cereal starch, added edible protein and a small amount of chemical leavening. A creamy substantially moisture free filling 14 is layered between the wafers. The filling is composed of shortening in which is distributed a finely divided protein such as milk protein and preferably a minor amount of flavoring such as sugar. A vitamin mineral mixture, when used, is also distributed in the filling. A coating such as a confectioner's coating 16 can be applied to the composite bar if desired.

DESCRIPTION OF THE PREFERRED EMBODIMENT

In accordance with the present invention a food bar 10 is provided which is composed of a wafer 12 and cream filling 14. The success of the invention is due in part to the physical make-up of the bar which consists of at least two phases, one being plastic, i.e. creamy or pasty and another which is rigid, both having edible protein added to them. It was discovered that by distributing the protein used for fortification between two phases, that many of the deficiencies associated with the nutritional foods previously proposed could be overcome.

The bar is preferably composed of a plurality, preferably at least three crisp wafers stacked one above the other with the creamy filling between them. Typically, each wafer consists of 10 parts of cereal flour (e.g., wheat flour), 6 or more parts of added protein, e.g., the calcium caseinate or a lactalbumin-caseinate coprecipitate, about 0.8 parts oil as a release agent and a small amount of chemical leavening. While the bar as a whole provides a unique structure, the composition of the wafer portion of the bar is itself unique in composition.

The composition of the wafer will now be described. The wafer is dry, crisp, relatively thin and is fortified with added edible protein. It consists of 10 parts of wheat or other cereal grain flour, a minor amount of shortening, e.g., .2 to 5 parts to act as a separating agent from molds in which the wafers are baked. One suitable shortening consists of about 0.7 part oil such as cottonseed oil and about 0.25 part soy lecithin. A minor amount of chemical leavening is also used, e.g., about 0.5 when ammonium bicarbonate is used as the leavening agent.

Protein fortification is accomplished with any edible protein that does not impart an undesirable taste to the wafer. Examples are lactalbumin-casein coprecipitate, calcium caseinate, purified or refined grades of casein or mixtures thereof. Sodium caseinate and soy isolates, if used, should be used in conjunction with calcium ions, e.g., by adding about .5 part calcium lactate, calcium chloride or other calcium salt for each 10 parts of sodium caseinate. Of these, calcium caseinate is preferred because of cost and batter characteristics at relatively high concentrations.

There is no minimum amount of protein that can be added since any additional amount will have a small but measurable effect upon increasing the protein content of the wafer. It has been found, however, that to meet the established nutritional standards we have adopted, above 20% and preferably over 25% of dry composition should be added protein. We have found that when lactalbumin-casein coprecipitate or calcium caseinate is employed, they can be used in the amount of about .2 to 10 or more parts for each 10 parts of flour with about 4 to 7 parts being preferred for each 10 parts of flour.

To prepare the wafers a batter is made by adding the dry ingredients in a ratio of from abut 150 to 250 parts water for each 100 parts dry ingredients with about 175–225 parts water being preferred. If soy protein or sodium caseinate is used, the calcium salt is added to the water before other dry ingredients. The protein is then added slowly to the water with high shear mixing. The remaining ingredients are then added with continued mixing. The batter is then poured ito wafer molds of the kind employed in commercial baking of crackers and wafers and baked at 450° F. for three minutes.

The filling is a unique water-free combination of about equal parts of shortening and edible protein in finely divided powdered form. To prepare the filling, the protein is added to the shortening and mixed vigorously until a stable cream (or dispersion) is formed.

The shortening is used in amounts up to about 40% of the filling. It can comprise any edible shortening which is plastic (not brittle) at room temperature. One suitable shortening is less than 50% solids and typically about 20 to 30% solids at room temperature. High melting point shortenings will not provide the proper eating characteristics and will not provide the required creamy texture.

Of the proteins that can be used in the filling, the preferred protein is a lactalbumin-casein coprecipitate, hereinafter referred to as "coprecipitate." The coprecipitate can be manufactured by any known process such as those described in the following patents: 2,623,038; 2,750,374; 2,970,913; 2,665,989; 3,001,876.

Coprecipitates can also be prepared by precipitation from milk by the addition of calcium chloride as described in "The Manufacture of Calcium Coprecipitation," by Buchanan, Snow and Hayes, *The Australian Journal of Dairy Technology*, September 1965, p. 139. The coprecipitate which results from such processes as described above is relatively insoluble and is gritty when added to a food composition. It is preferred that the coprecipitates be resolubilized to a predetermined degree. While the coprecipitates can be resolubilized in many different ways, for example, by exposure to strong alkali followed by ammonium hydroxide as described in Pat. 2,832,685 or by the addition of amomnium hydroxide to provide a pH of about 7.4 to 7.8, it is preferred to resolubilize the coprecipitate by the addition of sodium tripolyphosphate. Resolubilization of the protein with the addition of 1% sodium tripolyphosphate calculated on the dry weight of the precipitate has a higher degree of grittiness. Good results are achieved with 2% STPP solution. When 6% STPP is used, the resulting coprecipitate is much more soluble and if used in the wafer batter relatively large amounts of water are absorbed. Accordingly, the coprecipitate, in accordance with the invention, is preferably resolubilized to such a degree that the water absorptivity thereof is increased sufficiently to remove the gritty mouth feel when eaten but without sufficient additional resolubilization to absorb large quantities of water. Thus, the resolubilization is stopped upon reaching a point just sufficient to remove the gritty mouth feel. It is preferred that the coprecipitate is resolubilized, for example by redispersing the curd in water containing 2% sodium tripolyphosphate calculated on the dry weight of the curd.

While calcium caseinate, sodium caseinate, soy proteins and other edible proteins can be used, the taste is not as good as with the milk coprecipitate.

To improve the taste of the filling, a minor amount of sugar can be added. Confectioners sugar is preferred. The filling can contain, for example, about 10 to 30 percent sugar and other flavor. When the bar composition is to contain added vitamins and minerals, they are incorporated into the filling which has been found to stabilize them probably by protecting them from moisture and oxygen.

To prepare the filling, all ingredients except the protein are added to the shortening and mixed to form a cream. The protein is then added with continued mixing to obtain a homogeneous creamy consistency. During this time, a certain amount of air may be incorporated into the composition which adds to its creaminess. The shortening is then spread and applied as a layer about 1/10 of an inch thick between the wafers.

In summary, it was found that soy protein, sodium caseinate, casein, lactalbumin and other sources of protein performed poorly for use in the filling compared with coprecipitate for a variety of reasons.

It was found that calcium caseinate and coprecipitate as sources of added protein are acceptable at relatively high levels if incorporated into the wafer because their water absorptions are fairly low and they are not gritty. Moreover, they present relatively minor flavor problems that can be readily overcome by adding a compatible flavoring. It was found, on the other hand, that calcium caseinate now available from commercial sources, if mixed with shortening, presents an off-flavor problem which is relatively difficult to mask.

The amount of protein to be added to the filling can be varied from any minor amount up to an amount about equal to or greater than the amount of shortening.

If a confectioners coating designated 16 in the figure is used, it is applied, for example, by spraying or dipping. The term "confectioners coating" is used herein to mean a coating consisting of a base composed of cocoa butter or the equivalent and optionally a flavor. If desired, one of the aforementioned proteins can be incorporated into the "confectioners coating," generally not exceeding 20% and preferably around 10% of the coating.

The finished product is thus composed of a wafer which contains about 35% added protein but even up to as high as 60% or more added protein and a creamy filling which consists of up to half or more protein uniformly distributed through a plastic matrix. In a preferred embodiment of the invention, the filling makes up about half of the composition, the wafers about 30%, the confectioners coating about 20%. A minor amount of granular topping can be applied over the coating for flavor and visual appeal. The bars are preferably of such dimensions that one serving of two bars provides 1/4 of the Recommended Daily Allowance of high quality protein, vitamins, minerals and contains about 12 grams of protein, about 12 grams of fat, about 21 grams of carbohydrate and about 250 calories. The product is acceptable in flavor and textural quality after storage at 70° F. and 12 months as judged by standard taste panel tests.

The success of the invention in providing a shelf stable protein fortified food bar is due in large part to the provision of two phases, one solid and one plastic with added protein present in both phases. In this way the wafer is prevented from being tough as it would be if all of the added protein were placed in the wafer. On the other hand, if all the protein had been placed in the filling, much more shortening would be required which would defeat the limited calorie objectives. Because the protein present in the filling is protected from hydration in the mouth when eaten, the characteristic drying of the mouth due to the absorption of moisture by protein is avoided.

The shelf stability of the bars is exceptional. This stability is believed to be in large measure due to the exclusion of water from the overall formulation without sacrificing the creamy eating quality of the bar. In this way the eating quality, characterized by the sharp textural diversity between the crisp wafer and creamy filling, is maintained through extended periods of storage. Furthermore, the stability of the vitamins present in the bar is outstanding. This is apparently due to the fact that the vitamins are not exposed to water in the filling and additionally are shielded from ambient oxygen and moisture by the protective shortening matrix of the filling.

By the term "high utilization value" is meant having a biological utilization value of at least 70 compared to egg as 100.

The term "wafer" is used here to mean a porous, crisp food having a cereal flour or starch base and having a thickness of from about 1/16 of an inch to 1/2 inch with or without added protein.

The invention will be better understood by reference to the following examples.

EXAMPLE I

A filling is made up having the following composition:

| | |
|---|---|
| Plastic shortening (vegetable) | 35 |
| Milk protein (casein-lactalbumin coprecipitate) | 34 |
| Powdered sugar | 20 |
| Vitamin and flavor blend [1] | 10 |
| Color | .6 |
| Emulsifier (lecithin) | .4 |

[1] Vitamin and flavor blend:

| | Percent |
|---|---|
| Vitamin and mineral mixture | 44 |
| Powdered sugar | 38 |
| Caramel flavor | 10 |
| Salt | 4 |
| Vanilla flavor | 2.5 |
| Butterscotch flavor | 1.5 |

The vitamin and flavor preblend is dry blended until homogeneous. The shortening, caramel color and emulsifier are placed in a horizontal dual sigma mixer and run at high speed until the texture is creamy and uniform; approximately three minutes. The vitamin flavor preblend is then added together with the powdered sugar and mixing is continued until a uniform texture is obtained; approximately three minutes on high speed. The milk protein is then added to the mixer and mixing is continued until a uniform color and texture is achieved; approximately another three minutes on high speed. Mixing temperature should be about 75° F.

The wafers are prepared in accordance with the following formula:

| | Percent |
|---|---|
| Wheat flour | 62.25 |
| Milk protein (casein-lactalbumin coprecipitate) | 35 |
| Cottonseed oil | 2 |
| Lecithin emulsifier | 0.5 |
| Ammonium bicarbonate | 0.25 |

This composition is mixed with about 200 parts water for each 100 parts dry mix. The batter is then poured into wafer molds and baked for about 3 minutes at approximately 450° F. The filling is then spread to a thickness of about 1/10 inch and a complete bar is formed by providing three wafers measuring about 1½ inches by 3½ inches separated by two layers of filling. A small amount of flavored confectioners coating is applied to the finished bar.

EXAMPLE II

The bars are prepared in accordance with Example I except that calcium caseinate is used in place of the coprecipitate.

EXAMPLE III

The bars are made as in Example I using the following edible proteins in separate runs in place of the coprecipitate: refined casein, sodium caseinate [2], soy protein [2], bean protein, lactalbumin, egg protein.

EXAMPLE IV

Bars are made as in Example I except that calcium caseinate is employed in the wafer in place of the coprecipitate.

What is claimed is:

1. A protein fortified food bar comprising a plurality of layers of wafers stacked one above the other, each said wafer being a baked food product comprising shortening in an amount effective to act as a mold release agent during the baking of said baked wafers, the residue of a leavening agent in an amount resulting from an effective quantity of leavening to leaven the wafers and a member selected from the group consisting of cereal flour and cereal starch, a layer of cream filling substantially free of moisture between adjacent wafers, said filling comprising a dispersion of an edible protein in finely divided particulate form dispersed in a plastic shortening, said edible protein being at least one member selected from the group consisting of finely divided particles of calcium caseinate, bean protein, lactalbumin, egg protein, refined casein, sodium caseinate, soy isolates and lactalbumin-casein co-precipitate resolubilized insignificantly more than sufficient to remove gritty mouth feel therefrom, said protein being present in the filling from a minor amount at least sufficient to increase the protein content of the food bar up to an amount about equal to the plastic shortening, said plastic shortening enveloping and protecting the protein from hydration when eaten to thereby help to prevent the product from creating a dry sensation in the mouth when eaten and the layers of filling between the wafers softening the chewing characteristics of the bar.

2. The composition of claim 1 wherein the wafers contain calcium caseinate and said edible protein dispersed in said filling is lactalbumin-casein coprecipitate.

3. A composite food bar comprising a rigid phase comprising a plurality of dry crisp baked wafers adjacent one another, each said wafer comprising shotening in an amount effective to act as a mold release agent during the baking of said baked wafers, the residue of a leavening agent in an amount resulting from an effective quantity of leavening to leaven the wafers and a member selected from the group consisting of cereal flour and cereal starch, and a plastic phase comprising creamy filling between adjacent wafers including a mixture of plastic shortening and an edible protein in finely divided form dispersed therein, said edible protein being present in the filling from a minor amount at least sufficient to increase the protein content of the food bar up to an amount about equal to the plastic shortening, the protein dispersed in the plastic shortenng being protected from moisture absorption by the enveloping shortening when eaten to help prevent the product from creating a dry sensation in the mouth and the layers of filling softening the shewing characteristics of the bar.

4. The composition according to claim 3 wherein the protein comprises a lactalbumin-casein coprecipitate.

5. The composition of claim 3 wherein a minor amount of carbohydrate is dispersed in the plastic phase.

6. The composition of claim 3 wherein a mixture of vitamins and minerals is contained in the plastic phase.

7. A method of preparing a protein fortified food bar comprising preparing baked wafers comprising a member selected from the group consisting of cereal starch and

---

[2] Calcium lactate in the amount of about .5 parts is added for each 10 parts sodium caseinate or soy protein as the case may be.

cereal flour in a major amount, shortening in an amount effective to act as a mold release agent during the baking of said baked wafer, a leavening agent in an amount effective to leaven the wafers and a quantity of edible protein in the amount of 0.2 to 10 parts for each 10 parts of flour in addition to that present in the flour, admixing water to form a batter and baking the batter to form the wafers, preparing a creamy filling by dispersing a finely divided edible protein in a plastic shortening until a homogeneous creamy mixture is obtained, said protein being present in the filling from a minor amount at least sufficient to increase the protein content of the food bar up to an amount about equal to the shortening, said plastic shortening comprising a matrix for the protein and distributing the filling in layers between the wafers to form a composite sandwich-like structure consisting of alternate layers of wafers and filling, said plastic shortening enveloping and protecting the protein distributed therethrough from moisture to reduce the sensation of dryness otherwise perceived when powdered protein is eaten and the layers of filling being adapted to soften the chewing characteristics of the bar.

8. The method according to claim 7 wherein a vitamin and mineral mixture is incorporated into the filling by mixing to obtain a uniform distribution of the vitamin and mineral mixture throughout the filling.

9. The method according to claim 7 wherein the wafers are prepared by admixing wheat floor, a lactalbumin-casein coprecipitate, a minor amount of shortening as a pan release agent and a chemical leavening and from about 175 to about 225 parts of water for each 100 parts of dry mix, pouring the batter into wafer molds and baking the resulting wafers until they are crisp.

10. The process of claim 9 wherein the filling is prepared by mixing a plastic shortening in the amount of less than 40% by weight of the filling, an edible milk protein and a carbohydrate, mixing the composition until the protein is uniformly distributed throughout the shortening to form a paste in which the shortening comprises a creamy matrix in which the milk protein and carbohydrate is dispersed.

11. The method according to claim 10 wherein a confectioners coating is applied to the completed bar.

12. A layered food bar comprising a plurality of baked wafers adjacent one another and a layer of substantially dry filling between adjacent wafers, the filling having a creamy plastic consistency at room temperature, said wafers comprising a member selected from the group consisting of cereal flour and cereal starch, shortening in an amount effective to act as a mold release agent during the baking of said baked wafers, the residue of a leavening agent in an amount resulting from a quantity of leavening effective to leaven the wafers and said filling comprising at least one member selected from the group consisting of caseinate and lactalbumin in finely divided particulate form dispersed in a fat, the protein being present in the filling from a minor amount at least sufficient to increase the protein content of the food bar up to an amount about equal to the quantity of fat present, the fat defining a continuous matrix enveloping and protecting the protein from hydration when eaten to help prevent the product from creating a dry sensation in the mouth and the filling applied to the wafer softening the chewing characteristics of the bar.

13. A high protein bar having a wafer portion connected in physical association with a filling portion,
(a) the wafer portion comprising: 10 parts of at least one of cereal grain flour and edible starch; an effective amount up to about 10 parts added protein, in addition to that naturally present in the flour, the added protein being at least one member selected from the group consisting of finely divided particles of calcium caseinate, bean protein, lactalbumin, egg protein, refined casein, sodium caseinate, soy isolates and lactalbumin-casein coprecipitate resolubilized insignificantly more than sufficient to remove gritty mouth feel therefrom; and 0.2–5 parts edible oil, and the residue of a leavening agent in an amount resulting from an effective quantity of leavening to leaven the wafers; and
(b) the filling portion consisting essentially of a creamy mixture of: shortening and protein in particulate form comprising a member selected from the group consisting of calcium caseinate, bean protein, lactalbumin, egg protein, sodium caseinate, soy isolates and casein-lactalbumin coprecipitate resolubilized insignificantly more than sufficient to remove gritty mouth feel therefrom with the shortening enveloping the protein and constituting up to about 40 weight percent of the filling and the protein constituting up to about equal parts with the shortening; and about 10–30 weight percent sugar; said shortening being sufficiently low in solids as to be non-brittle at room temperature; and
(c) the bar having these characteristics: that the protein has a biological utilization value of at least 70, compared to egg as 100; that an amount thereof which will provide 250 calories will also provide about one-quarter the adult R.D.A. of protein; that the filling is substantially water-free; and that the shortening of the filling substantially envelops the protein of the filling to prevent hydration thereof.

14. The high protein bar of claim 13 further including an exterior confectioners coating consisting essentially of cocoa butter containing up to about 20 percent by weight added protein.

References Cited

UNITED STATES PATENTS

| | | | |
|---|---|---|---|
| 2,738,277 | 3/1956 | Cryns | 99—83 |
| 3,185,574 | 5/1965 | Garby et al. | 99—86 |
| 3,431,112 | 3/1969 | Durst | 99—83 X |
| 3,446,623 | 5/1969 | Gray et al. | 99—92 X |

RAYMOND N. JONES, Primary Examiner

J. R. HOFFMAN, Assistant Examiner

U.S. Cl. X.R.

426—89, 103, 155, 162, 274, 810